United States Patent [19]
Kawakami et al.

[11] Patent Number: 5,848,203
[45] Date of Patent: Dec. 8, 1998

[54] POLARIZATION-INDEPENDENT OPTICAL ISOLATOR

[75] Inventors: Shojiro Kawakami, Atagobashi Mansion Farao C-09, Tsuchitoi 236, Wakabayashi-ku, Sendai-shi Miyagi, 980, Japan; Kazuo Shiraishi, 868, Nishiohwa, Washimiya-machi, Kitakatsushika-gun, Saitama 340-02, Japan; Masashi Shimo, Funabashi, Japan

[73] Assignees: Sumitomo Osaka Cement Co., Ltd., Tokyo; Shojiro Kawakami, Sendai; Kazuo Shiraishi, Kitakatsushika-gun, all of Japan

[21] Appl. No.: 793,227
[22] PCT Filed: Jul. 10, 1996
[86] PCT No.: PCT/JP96/01910
  § 371 Date: Feb. 4, 1997
  § 102(e) Date: Feb. 4, 1997
[87] PCT Pub. No.: WO97/07425
  PCT Pub. Date: Feb. 27, 1997

[30] Foreign Application Priority Data

Aug. 14, 1995 [JP] Japan ................. 7-207185

[51] Int. Cl.[6] ........................... G02B 6/26
[52] U.S. Cl. ................... 385/11; 385/43; 385/33
[58] Field of Search ................... 359/484, 495, 359/496, 497; 372/703; 385/11, 33, 34, 35, 73, 74, 31

[56] References Cited

U.S. PATENT DOCUMENTS 5,588,078 12/1996 Cheng et al. ...................... 385/33
5,642,448 6/1997 Pan et al. ...................... 385/31

FOREIGN PATENT DOCUMENTS

| | | |
|---|---|---|
| 53-149046 | 12/1978 | Japan . |
| 57-100410 | 6/1982 | Japan . |
| 61-87101 | 5/1986 | Japan . |
| 63-303309 | 12/1988 | Japan . |
| 5-224153 | 9/1993 | Japan . |
| 6-34916 | 2/1994 | Japan . |
| 07043640 A | 2/1995 | Japan . |
| 7-43640 | 2/1995 | Japan . |

OTHER PUBLICATIONS

K. Shiraishi, Y. Aizawa, S. Kawakami; "Beam Expanding Fiber Using Thermal Diffusion of the Dopant"; IEEE Journal of Lightwave Technology; Aug. 1990; vol. 8, pp. 1151–1161.

Primary Examiner—Hung N. Ngo
Attorney, Agent, or Firm—Pillsbury Madison & Sutro LLP

[57] ABSTRACT

An optical isolator for preventing reflection-returned light from entering back into the emitter of an optical system such as an optical fiber communication or an optical disc input/output device, using semiconductor laser. The polarization-independent optical isolator includes a light-emitting side optical fiber having a diameter of a core expanded to give a mode field diameter at an end face of 20 to 50 $\mu$m, a light-incident side optical fiber having a diameter of a core expanded to give a mode field diameter at an end face of 20 to 50 $\mu$m, and an optical isolator element provided between the light-emitting side optical fiber and the light-incident side optical fiber, said optical isolator element comprising a first polarization beam splitter located at a side of the light-emitting side optical fiber, a second polarization beam splitter located at a side of the light-incident side optical fiber, and a Farady rotator provided between the first polarization beam splitter and the second polarization beam splitter, and at least said first polarization beam splitter being a wedge type polarization beam splitter.

19 Claims, 6 Drawing Sheets

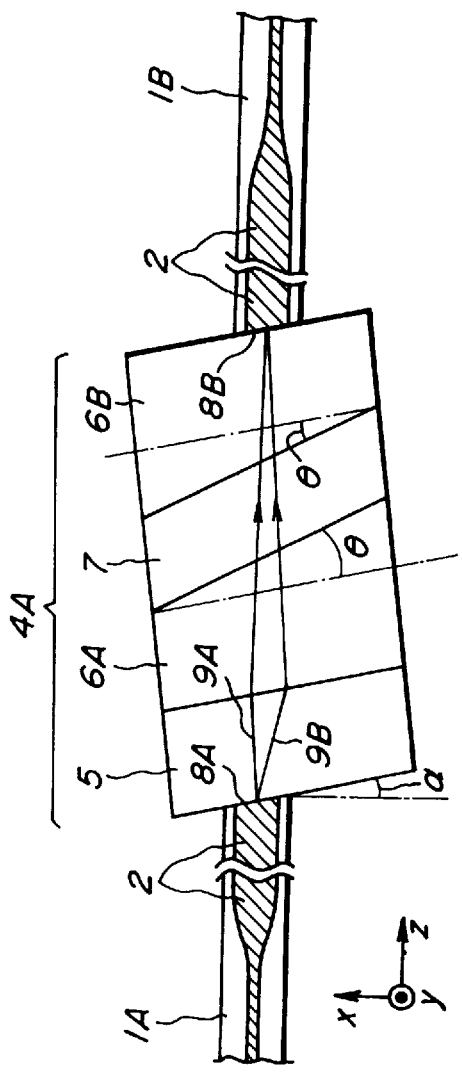
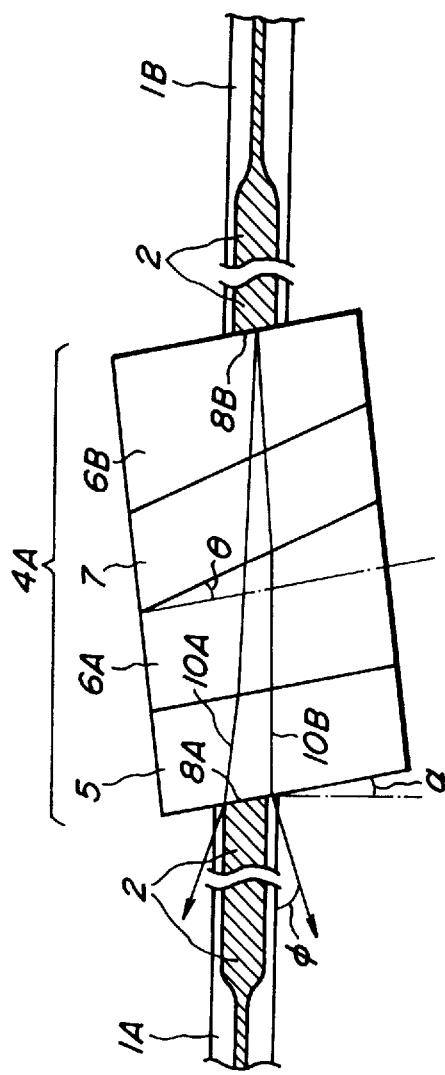

FIG._5

POLARIZATION-INDEPENDENT OPTICAL ISOLATOR

FIELD OF THE INVENTION

The present invention relates to an optical isolator, in an optical system employing a semi-conductor laser, wherein the isolator prevents reflected or returned light from entering into the emitter of the optical system. Applications of such a system include fiber-optic communication, reading to and writing from optical discs, etc.

BACKGROUND ART

Polarization-independent optical isolators employing a semiconductor laser are often used for interrupting reflection-returned light in optical systems such as optical fiber communication systems and optical disc input/output devices. In particular, a polarization-independent optical isolator must be attached to a optical fiber amplifier to prevent fluctuations in its outputs. The polarization-independent optical isolator using a polarization beam splitter functions in such a way that optical paths for respective polarized components having their polarized directions orthogonal to each other are separated or coupled (JP-B 60-49297, JP-B 61-58808, etc.).

FIG. 5 is a schematic view for showing a polarization-independent optical isolator using wedge type polarization beam splitters as proposed in JP-B 61-58809. A first lens 27A opposes an end face of a light-emitting side optical fiber 26A, whereas a second lens 27B opposes an end face of a light-incident side optical fiber 26B. Arranged between the first lens 27A and the second lens 27B are a first wedge type polarization beam splitter 28, a Farady rotator 29 and a second wedge type polarization beam splitter 30 in this order.

Two polarized components being orthogonal to each other are emitted from the light-emitting side optical fiber 26A, and pass through first lens 27A. As the polarized components pass the first wedge type polarization beam splitter 28, they undergo different refractions depending upon their polarizations, so that they are separated into two beams 31A and 31B. The polarization planes of the separated polarized components 31A and 31B are turned by the Farady rotator 29, and the polarized components are converted into parallel beams through their angular changes by means of the second wedge type polarization beam splitter 30. At this time, the polarized components emitted from the second wedge type polarization beam splitter 30 have the same orientation, but they are positionally deviated. This parallel light is focused into the light-incident side optical fiber 26B by the second lens 27B.

On the other hand, reflected light propagating in a backward direction is shown by dotted lines. Polarized components constituting the return light and being orthogonal to each other are binarily divided by the second wedge type polarization beam splitter 30, and the polarization plane of each of the polarized components separated is turned by the Farady rotator 29 in the same direction as the forward direction. As a result, the polarization direction in which the polarized component passes the first wedge type polarization beam splitter 28 differs from that in the case of the forward propagation by 90°. Consequently, the polarization components deviate positionally and angularly from each other, different from the light beams in the forward propagation. After the polarized components pass the first lens 27A, they become the parallel beams, but their optical axes are positionally deviated from that of the optical fiber 26A, so that the parallel beams are not coupled with the light-emitting side optical fiber.

FIG. 6 is a schematic view for showing a polarization-independent optical isolator using parallel-faced flat plate type polarization beam splitter as proposed in JP-B 60-49297. A first lens 27A is opposed to an end face of a light-emitting side optical fiber 26A, whereas a second lens 27B opposes an end face of a light-incident side optical fiber 26B. Arranged between the lens 27A and the lens 27B are a first parallel-faced flat plate type polarization beam splitter 32, a Farady rotator 33, and second and third parallel-faced flat plate type polarization beam splitters 29, 34 in this order.

Two polarized components being orthogonal to each other are emitted from the light-emitting side optical fiber 26A in a forward direction, and pass the first lens 27A. As the polarized components pass the first parallel-faced flat plate type polarization beam splitter 32, they are separated into two beams. The polarization plane of each polarized component is turned by the Farady rotator 33. Then, two orthogonal polarized components are positionally shifted by the second and third parallel-face flat plane type polarization beam splitters 29, 34 so that the components may be coupled with each other again. Then, the components are focused by the second lens 27B, and led to the light-incident side optical fiber 26B. On the other hand, the polarized orthogonal components returning in a backward direction are binarily divided by the parallel-faced flat plate type polarization beam splitters 34, 29 in the same manner as mentioned above, and each of the components has the same polarization plane as the forward propagation, and the polarized components are led into the Farady rotator 33. The polarization plane of each polarized component is turned in the same direction as the forward propagation. As a result, the polarization direction in which the polarized component passes the first parallel-faced flat plate type polarization beam splitter 32 differs from that of the forward propagation by 90°. Consequently, the polarization components are angularly the same but deviated positionally with respect to the light in the forward propagation. After the polarized components pass the first lens 27A, they become beams having a large angle, so that they are not coupled with the light-emitting side optical fiber.

DISCLOSURE OF THE INVENTION

The conventional polarization-independent optical isolators mentioned above have the following problems.

(1) In order to couple the polarization-independent optical isolator element as shown in FIG. 5 or 6 with the light-emitting side optical fiber, it is necessary to collimate the light beams emitted from the light-incident side optical fiber. In order to enhance a backward-direction loss, it is indispensable that the position and the angle of the light are changed by the lens to prevent the axially deviated light propagating in the backward direction from coupling with the light-emitting side optical fiber. Further, with respect to the light-incident side, it is necessary that the parallel light beams are effectively coupled by the lens to reduce the loss. For these reasons, a pair of lenses is provided between the light-emitting optical fiber and the optical isolator and between the light-incident side optical fiber and the optical isolator.

However, in order to align the optical system including such lenses, three-dimensional alignment including alignment of their focal points needs to be carried out one by one. In addition, such alignments require extremely high precision and a long working time period, as well as skill. In order even to begin mitigating the above problems, an example of a focusing system with only one lens is proposed, but it is still necessary and indispensable to effect alignments at high precision to insure that the lens is coupled properly with the optical fiber.

(2) In FIG. 5, the first wedge type polarization beam splitter 28 is used for separating the two polarized components. When the forward propagation exhibits birefringence property, the emitting direction of ordinary rays differs from that of extraordinary rays. The emitting direction of ordinary rays and extraordinary rays is equalized by the second wedge type polarization beam splitter 30. Because the ordinary rays and extraordinary rays are incident at different locations on the beam splitter 30, it is difficult to completely couple these polarized components, although the directions of the polarized components emitted are the same.

From the above reasons, unless the optical system is aligned at high precision and the light beams are coupled again, the optical isolator input loss is large and polarization dependency occurs. In particular, unless the optical axes of the polarized components are aligned with a higher precision, as the spot diameter of the light becomes smaller, the input loss increases. However, generally speaking, it is extremely difficult to effect the optical axis alignment in which the two separated polarized components are coupled again, and are aligned with a core of the optical fiber. The losses of the two polarized components become different from each other. Therefore, it is not easy to reduce the polarization dependency in a conventional polarization-independent optical isolator.

Under the circumstances, a method for lessening the positional deviation between the two polarized components is disclosed in JP-A 5-224153. However, a special optical system (e.g. using a special and expensive prism) including an optical system composed of a light-incident side optical fiber and lens as well as a lens in a light-emitting optical system having an optical axis at a different location needs to be added. Further, in order to obtain a high backward-direction loss, it is still necessary to rely on changing of the location and the angle the polarized components with the lenses.

(3) In a polarization-independent optical isolator using the parallel-faced flat plate type polarization beam splitter 32 as shown in FIG. 6, in order to realize a high backward-direction loss, the return light must not be coupled with the light-emitting side optical fiber 26A. This is accomplished by insuring that the reflected beams are not incident on the light emitting region of the side optical fiber 26A in the backward direction. For this purpose, it is necessary to increase the separation width of the parallel-faced flat plate type polarization beam splitter 32. As a specific method, it is proposed that a sufficient length of the parallel-faced flat plate type polarization beam splitter 32, as viewed in the fiber-axis direction, is ensured (JP-B 60-49297) and that the separation width is set at not less than 0.66 times as long as that of a fiber-propagated light MFD by using a lens (JP-A 7-43640).

(4) For convenience in assembling, light is introduced vertically into the isolator element. However, the light is not only likely to be reflected at an interface, but also the optical axis of the light-incident side optical fiber is not the same as that of the light-emitting side optical fiber. Therefore, when a fiber-embedded type isolator is to be produced, the optical axis of each optical fiber is preliminarily deviated by a deviated amount between the above optical axes.

For the above reasons, if a polarization-independent optical isolator is produced which satisfies characteristics (generally, the input loss$\leq$1 dB, the backward-direction loss$\geq$40 dB) required by users, the number of partsincreases, the number of assembling steps largelyincreases, and the isolator becomes bulky and costly.

It is an object of the present invention in connection with the polarization-independent optical isolator to remove a complicated and difficult step for optically connecting the lenses and the optical fibers so as to collimate the light incident from the light-emitting side optical fiber, enhance the efficiency in coupling the light with the light-incident side optical fiber and prevent the return light from being coupled with the light-incident side optical fiber.

It is another object of the present invention to decrease the loss in re-coupling between the ordinary rays and the extraordinary rays separated by the polarization beam splitter and to eliminate an optical coupling step required to accomplish the above re-coupling in the forward propagation. It is also an object of the present invention to make the optical isolator compact. It is a still further object of the present invention to prevent deviation in the optical axis between the light-incident side optical fiber and the light-incident side optical fiber.

Further, it is an additional object of the present invention to provide a polarization-independent optical isolator suitable for mass production by decreasing the number of parts and the number of assembling steps and making the separator compact, provided that the input loss is not more than 1 dB and the backward-direction loss is not less than 40 dB.

The polarization-independent optical isolator according to the present invention comprises a light-emitting side optical fiber having a diameter of a core expanded to give a mode field diameter at an end face being 20 to 50 $\mu$m, a light-incident side optical fiber having a diameter of a core expanded to give a mode field diameter at an end face being 20 to 50 $\mu$m, and an optical isolator element provided between the light-emitting side optical fiber and the light-incident side optical fiber, said optical isolator element comprising a first polarization beam splitter located at a side of the light-emitting side optical fiber, a second polarization beam splitter located at a side of the light-incident side optical fiber, and a Farady rotator provided between the first polarization beam splitter and the second polarization beam splitter, and at least said first polarization beam splitter being a wedge type polarization beam splitter.

The present inventors have succeeded in the production of the novel polarization-independent optical isolator which fully utilizes the features and characteristics of the core-expanded optical fiber in that tolerance in assembling in terms of the position and the direction is mitigated by a reduced numerical aperture and that the input loss is reduced by mitigating the diffracting effect. That is, the core-expanded optical fiber has a smaller numerical aperture and high latitude in choosing position and direction, whereas the core-expanded optical fiber has an extremely narrow allowable range with respect to the angular deviation and input loss due to the diffracting effect of the lens.

The present inventors have succeeded in providing the small size polarization-independent optical isolator, which can be more easily assembled as compared with the conventional optical isolators and at the same time has a high backward-direction loss and a low input loss, by using the core-expanded optical fibers having the above characteristics in the light-emitting side and light-incident side optical fibers and using the wedge type polarization beam splitter in the optical isolator element without using a single lens between the light-incident and light-emitting optical fibers.

As mentioned above, according to the present invention, since no lens is used contrary to the conventional optical isolators, the number of parts can be decreased, and the construction cost can be reduced by eliminating the aligning step.

An optical fiber described in K. Shiraishi, Y. Aizawa, and S. Kawakami, "Beam expanding fiber using thermal diffusion of the dopant", IEEE J. Lightwave Technology, 8, 1151(1990) may be preferably used as the core-expanded optical fiber. Further, as the polarization beam splitter, a birefringent crystal such as rutile and calcite and an artificial birefringent material made of a dielectric multi-layer film may be preferably used. As the Farady rotator, a material having a large Verdet constant, such as magnetic garnet, may be preferably used.

BRIEF DESCRIPTION OF THE DRAWINGS

FIG. 1(a) is a schematic view for illustrating a polarization-independent optical isolator as an embodiment of the present invention (forward propagation being shown), FIG. 1(b) is a schematic view for showing a state in which light is propagated in the isolator of FIG. 1(a) in a backward direction;

BEST MODE FOR CARRYING OUT THE INVENTION

Figure 2:
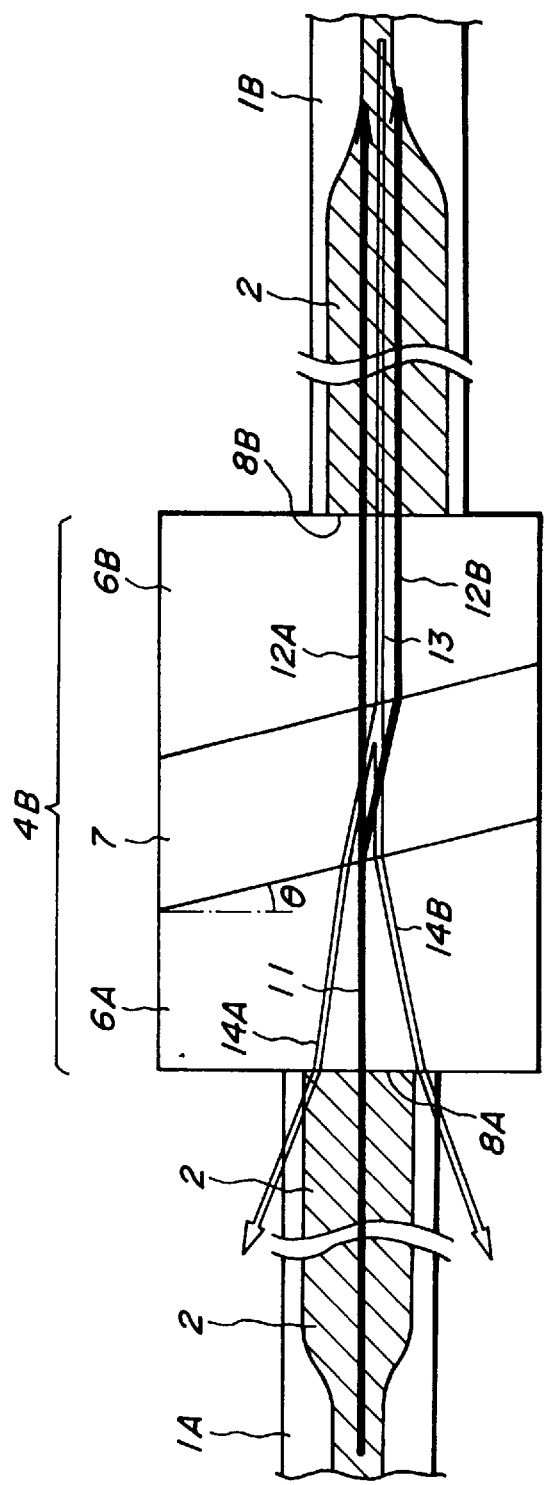
FIG. 2 is a schematic view for showing a polarization-independent optical isolator as another embodiment according to the present invention.

In a preferred embodiment, in order to correct the deviation in the optical axis between the ordinary rays and the extraordinary rays caused by the first polarization beam splitter, the second polarization beam splitter and the Farady rotator during the forward propagation, an optical axis deviation-correcting element made of a parallel-faced flat plate type polarization beam splitter is preferably provided. By doing so, the light-coupling efficiency in the forward direction is further enhanced.

In another preferred embodiment, not only the first polarization beam splitter but also the second polarization beam splitter are wedge type polarization beam splitters, and the first polarization beam splitter and the second polarization beam splitter are opposed to each other and turned by a half turn around the center axes of the optical fibers. That is, the first and second polarization beam splitters are arranged symmetrically with respect to the Farady rotator. Since the deviation in the optical axis between the light-incident side optical fiber and the light-emitting side optical fiber is removed by using a pair of the wedge type polarization beam splitters, the optical axes are more easily aligned.

The present invention will be further explained in more detail with reference to the drawings.

FIG. 1(a) is a schematic view (in the forward propagation) for showing the polarization-independent optical isolator according to an embodiment of the present invention, and FIG. 1(b) a schematic view for showing the paths of light propagated in the isolator of FIG. 1(a) in the backward direction. An input side end face of the light-incident side optical fiber and an output side end face of the light-emitting side optical fiber are omitted from the figures. In FIG. 1(a), the light emitted from an end face 8A of an expanded portion 2 of a core of a light-emitting side optical fiber 1A and having a small numerical aperture is led into a parallel-faced flat plate type polarization beam splitter 5 at an incident angle α, and divided into two polarized components 9A and 9B. The two polarized components 9A and 9B enter a first wedge type polarization beam splitter 6A. Since this polarization beam splitter is made of a birefringent crystal, each polarized component is refracted inside this birefringent crystal, depending upon its refractive index. The polarization planes of the two polarized components having undergone different angular changes are turned by a Farady rotator 7, respectively.

While ordinary rays and extraordinary rays are not exchanged, the polarized components enter a second wedge type polarization beam splitter 6B where the polarized components are coupled again with each other. Since the optical axis of the re-coupled light is the same as that of the light-incident side optical fiber 1B, the light enters an end face 8B of the fiber 1B. The thickness, etc. of the parallel-faced flat plate type polarization beam splitter 5 are preliminarily aligned to offset the positional deviation between the two polarized components, which would occur depending upon the incident angle α and a pair of the wedge type polarization beam splitters 6A and 6B.

What contributes to a polarized component-dividing function of the wedge type polarization beam splitter 6A is a wedge angle θ, which does not depend upon the thickness of the splitter. Therefore, different from the parallel-faced flat plate type polarization beam splitter, the polarized components can be assuredly divided from each other even by shortening the wedge type polarization beam splitter. Thus, the length of the isolator element may be small. Although not limited, a wedge type polarization beam splitter having a wedge angle θ of 10° to 40° is used, and particularly a wedge type polarization beam splitter having a wedge angle θ of around 20° is preferably used. By so doing, the low diffracting characteristic of the core-expanded optical fiber can be further utilized so that the input loss of the entire polarization-independent optical isolator element 4A can be reduced. Furthermore, the optical isolator can be made conspicuously compact.

Next, the light propagating in the backward direction will be explained. As shown in FIG. 1(b), the light emitted from the end face 8B of the light-incident side optical fiber 1B and having a small numerical aperture is refracted, by the second wedge type polarization beam splitter 6B, depending upon the refractive index. The polarization planes of two polarized components shifted in respectively different directions are turned in the same direction as in the case of the incident polarized components by the Farady rotator 7. Therefore, while the ordinary rays and the extraordinary rays are exchanged, each polarized component enters the first wedge type polarization beam splitter 6A. In the splitter 6A, each of polarized components undergoes refraction depending upon its refractive index, so that the polarized components are not coupled into a single beam. In addition, the polarized components are positionally shifted by the parallel-faced flat plane polarization beam splitter 5.

Even if the positional deviation is slight, the propagating direction of the backward-direction light differs from the direction of the optical axis of the optical fiber because of the small numerical aperture of the core-expanded optical fiber. Therefore, it is difficult to couple the light with the optical fiber again, so that the backward-direction light components 10A or 10B does not enter the light-emitting side optical fiber 1A. Therefore, a high backward-direction loss can be easily realized.

With respect to the light-incident side optical fiber and the light-emitting side optical fiber, an incident angle α at the end face of the optical fiber is preferably greater than 0° to make the reflection loss smaller. Even if the light enters vertically (incident angle 0°), it does not greatly influence the input loss and the backward-direction loss. Further, the diffraction loss amounts to about a half of the input loss, and the diffraction loss increases with increase in a gap at each of the end faces of a pair of the optical fibers. However, excess increase in the length of the gap between the end faces of the fibers can be prevented by setting the incident angle α to not more than 5°. If the incident angle exceeds the above upper limit, it may be difficult to align the input loss of the polarization-independent optical isolator to not more than 1 dB.

When a mode field diameter (MFD) of the core-expanded optical fibers constituting the light-incident side and light-emitting side optical fibers is set at not less than 20 μm, the input loss caused by the diffraction with no lens can be reduced, and the backward-direction loss can be increased by appropriately setting the numerical aperture. Furthermore, increase in the excess loss can be prevented by setting the mode field diameter at not more than 50 μm. If the MFD is less than 20 μm or more than 50 μm, it is extremely difficult to ensure that the input loss and the backward-direction loss are not more than 1 dB and not less than 40 dB, respectively.

The expanded portion of the core of the core-expanded optical fiber is preferably sufficiently long. That is, the length of the area where the refractive index of the core-expanded portion is distributed in a taper shape is preferably not less than 2000 times as long as the wavelength. In this case, increase in the excess loss can be prevented.

The polarization-independent optical isolator of FIG. 2 uses an optical isolator element 4B in which fiber-axis deviation correcting parallel-faced flat plate type polarization beam splitter 5 is not inserted. The light emitted from an end face 8A of a light-emitting side optical fiber 1A and having a small numerical aperture enters a first wedge type polarization beam splitter 6A, and are divided into two polarized components. The polarization plane of each polarized component is turned by a Farady rotator 7.

While ordinary rays and extraordinary rays are not exchanged, each polarized component enters the second wedge type polarized beam splitter 6B in which the polarized component is converted to parallel beams, and the parallel beams are emitted from the splitter. The parallel beams enters the end face 8B of the light-incident side optical fiber 1B as they are. As mentioned above, what contributes to the polarized component-dividing function of the wedge type polarization beam splitter 6A is a wedge angle 6, which does not depend upon the thickness of the splitter. Therefore, the length of the isolator element can be shortened.

At the light-incident side, the orientation of each polarized component coincides with that of the optical axis of the light-incident side optical fiber 1B. The core-expanded optical fiber 1B has large tolerance with respect to the positional deviation. In addition, as mentioned above, the width of the wedge type polarization beam splitter 6A can be reduced. Therefore, since the distance between the polarized components 12A and 12B is small, the input loss due to the positional deviation between the polarized components can be made extremely small by using the core-expanded optical fiber 1B.

Next, the light propagating in the backward direction will be explained. The light 13 emitted from the light-incident side optical fiber 1B and having a small numerical aperture is refracted, by the second wedge type polarization beam splitter 6B, depending upon its refractive index. The polarization planes of the polarized components are turned in the same direction as in the case of the incident polarized components by the Farady rotator 7. Therefore, while the ordinary rays and the extraordinary rays are exchanged, each polarized component enters the first wedge type polarization beam splitter 6A. In the splitter 6A, each of polarized components 14A, 14B undergoes refraction depending upon its refractive index, so that the polarized components are not coupled into a single beam. Therefore, the backward-direction light does not enter the light-emitting side optical fiber 1A.

Figure 3:
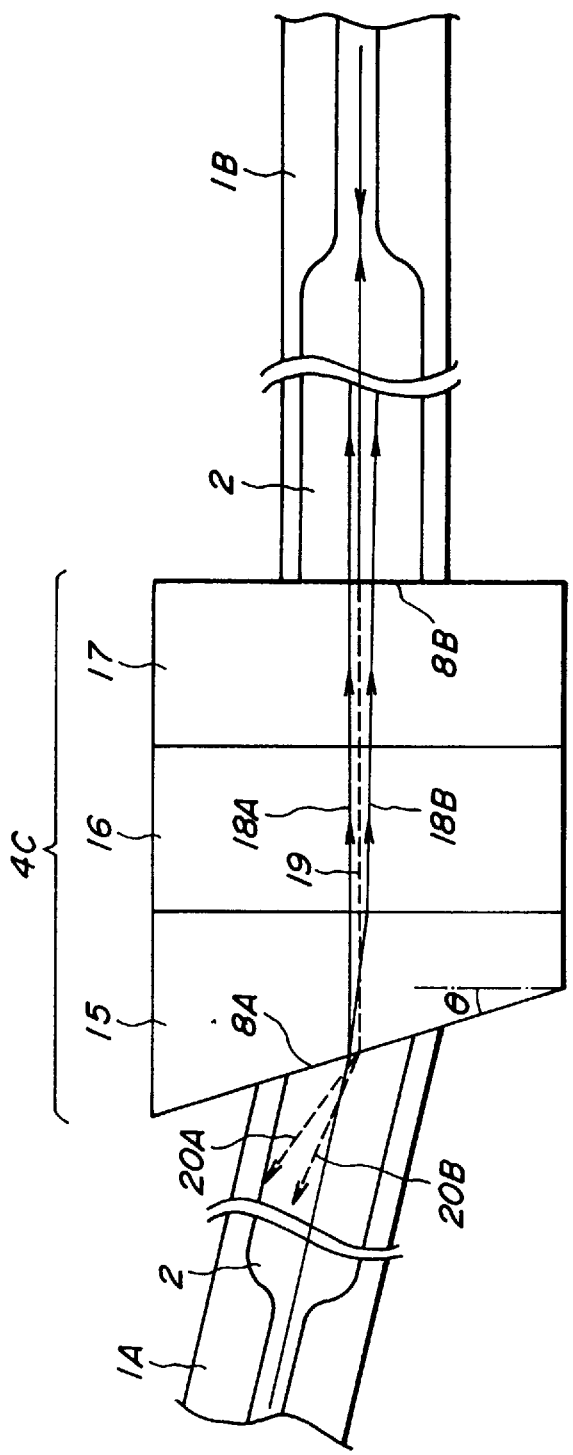
FIG. 3 is a schematic view for showing a polarization-independent optical isolator as a further embodiment according to the present invention.

The polarization-independent optical isolator in FIG. 3 employs an element 4C with only one wedge type polarization beam splitter. The light emitted from a light-emitting side optical fiber 1A and having a small numerical aperture enters a first wedge type polarization beam splitter 15 in which the light is divided into two polarized components 18A and 18B. When an inclined plane of the first wedge type polarization beam splitter is located at a side of the light-emitting side optical fiber 1A as in this embodiment, an incident angle α is preferably not more than (θ+5)°. The polarization plane of each of the polarized components 18A and 18B is turned by a Farady rotator 16. While ordinary rays and extraordinary rays are not exchanged, each polarized component enters a second parallel-faced flat plate polarization beam splitter 17 where the polarized component becomes parallel beams. The parallel beams are emitted, and enters a light-incident side optical fiber 1B as they are. As mentioned above, what contributes to a polarized component-dividing function of the wedge type polarization beam splitter 15 is a wedge angle θ, which does not depend upon the thickness of the splitter 15. Therefore, the length of the isolator element can be reduced.

At the light-incident side, the orientation of each of the polarized components 18A, 18B almost coincides with that of the optical axis of the light-incident side optical fiber 1B. The core-expanded optical fiber 1B has large tolerance with respect to the positional deviation. In addition, since the distance between the polarized components 18A and 18B is small, the input loss due to the positional deviation between the polarized components can be made extremely small.

The light 19 emitted from the light-incident side optical fiber 1B and having a small numerical aperture passes the second parallel-faced flat plate type polarization beam splitter 17. The polarization planes of two polarized components are turned in the same direction as in the case of the incident polarized components by the Farady rotator 16. Therefore, while the ordinary rays and the extraordinary rays are exchanged, each polarized component enters the first wedge type polarization beam splitter 15. In the splitter 15, each of polarized components 20A, 20B further undergoes refraction depending upon its refractive index, so that the polarized components are not coupled into a single beam. Therefore, the backward-direction light does not enter the light-emitting side optical fiber 1A.

Figure 4:
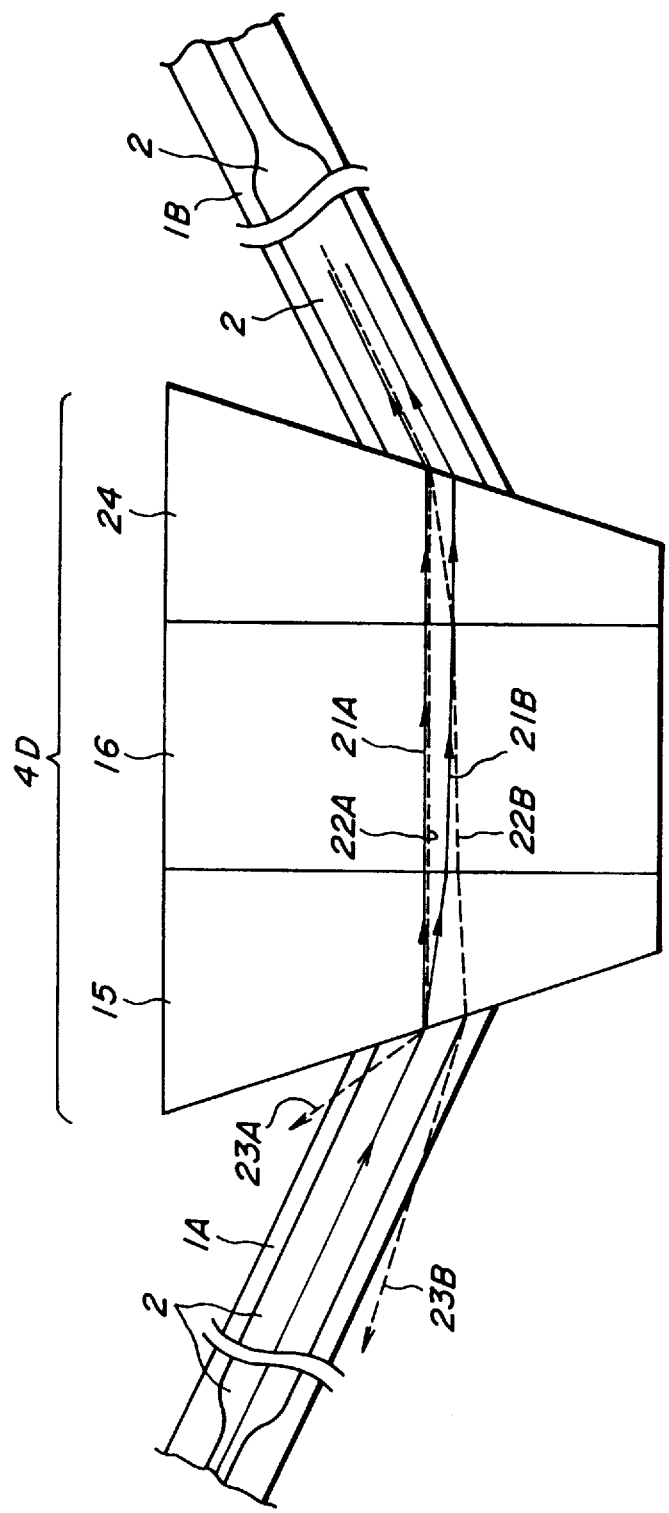
FIG. 4 is a schematic view for showing a polarization-independent optical isolator as another embodiment according to the present invention.
Figure 5:
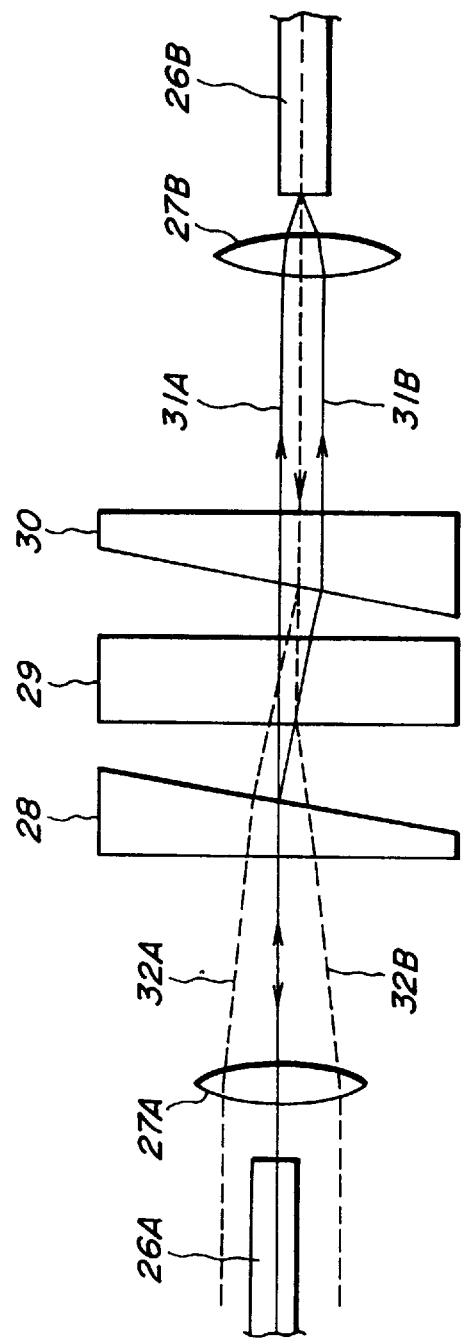
FIG. 5 is a schematic view showing a conventional polarization-independent optical isolator.
Figure 6:
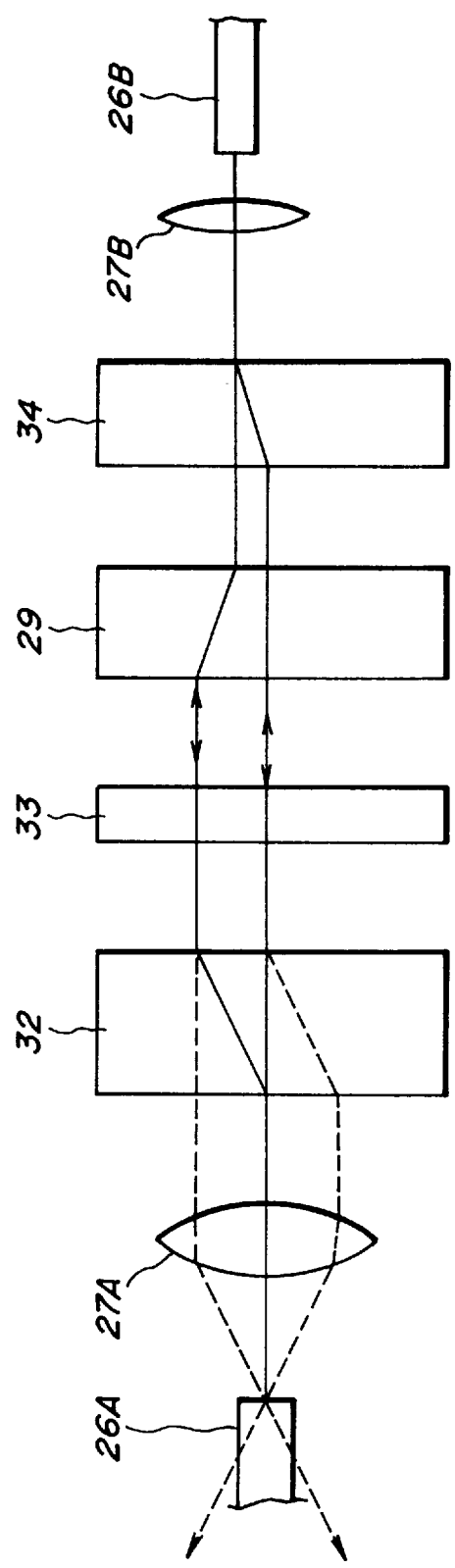
FIG. 6 is a schematic view showing the optical isolator as another conventional example.

The polarization-independent optical isolator in FIG. 4 employs an element 4D in which a pair of wedge type polarization beam splitters are used and arranged at respective positions axially symmetrical with respect to a Farady rotator 16. More specifically, the light emitted from a light-emitting side optical fiber 1A and having a small numerical aperture enters a first wedge type polarization beam splitter 15 in which the light is divided into two polarized components 21A and 21B. When an inclined plane of the first wedge type polarization beam splitter is located at a side of the light-emitting side optical fiber 1A as in this embodiment, an incident angle α is preferably not more than (θ+5)°. The polarization plane of each of the polarized components is turned by a Farady rotator 16. While ordinary rays and extraordinary rays are not exchanged, each polarized component enters a second parallel-faced flat plate polarization beam splitter 24 where the polarized component becomes parallel beams. The parallel beams are emitted, and enters the light-incident side optical fiber 1B as they are.

At the light-incident side, the orientation of each of the polarized components 21A, 21B coincides with that of the optical axis of the light-incident side optical fiber 1B. The core-expanded optical fiber 1B has large tolerance with respect to the positional deviation. In addition, since the distance between the polarized components 21A and 21B is small, the input loss due to the positional deviation between the polarized components can be made extremely small.

The light emitted from the light-incident side optical fiber 1B and having a small numerical aperture passes the second wedge type polarization beam splitter 24 where the light is divided into two polarized components 22A and 22B. The polarization plane of each of the two polarized components is turned in the same direction as the incident polarized components by the Farady rotator 16. Therefore, while the ordinary rays and the extraordinary rays are exchanged, each polarized component enters the first wedge type polarization beam splitter 15. In this embodiment, each of the polarized components 22A and 22B is emitted as 23A or 23B without entering the light-emitting side optical fiber 1A.

In the present invention, if a dielectric multi-layer film is used as the wedge type polarization beam splitter, the optical isolator can be advantageously made more compact. Further, optical parts including the light-incident side optical fiber, the light-emitting side optical fiber, the polarization beam splitter, the Farady rotator, etc. can be bonded together with an optical adhesive or the like. In addition, a so-called integrated type isolator can be produced. In this case, core-expanded optical fibers having undergone a beam-expanding treatment are fixed to a substrate, notches are formed on the substrate, and assembled isolator elements are inserted into the notches. When such an integrated type isolator, the number of the assembling steps can be further reduced.

EXAMPLES

Example 1

An optical isolator as shown in FIGS. 1(a) and 1(b) was produced. Rutile was used as a material for each of the wedge type and parallel-faced flat plane type polarization beam splitters, and the wedge angle was set at 19°. The thickness of the parallel-faced flat plane type polarization beam splitter was 170 μm. A magnetic garnet crystal was used as a material for a 45° Farady rotator 4, and its thickness was 375 μm. The total length of the optical isolator element 4A was 1100 μm. The MFD of each of the light-incident and light-emitting optical fibers was 40 μm, and the incident angle α and the wavelength of the incident light were 2.5° and 1.55 μm, respectively, so as to enhance reflection attenuation. The entire element was coated with a non-reflective agent for an adhesive, and fixed with a ultraviolet light-curable type adhesive. At that time, the optical axis of the light-emitting side optical fiber was aligned with that of the light-incident side optical fiber.

By using the polarization-independent optical isolator thus constructed, a low input loss of 0.35 dB, a high backward-direction loss of 52 dB and a sufficient reflection attenuation level of 60 dB could be obtained without using a lens.

Example 2

An optical isolator as shown in FIG. 2 was produced. Rutile was used as a material for the wedge type plane type polarization beam splitters, and the wedge angle θ was set at 20°. A magnetic garnet crystal was used as a material for a 45° Farady rotator, and its thickness was 375 μm. The total length of the isolator element was 600 μm. The MFD of the core-expanded optical fibers was 40 μm, and the incident angle α and the wavelength of the incident light were 0° and 1.55 μm, respectively, so as to enhance reflection attenuation. The entire element was coated with a non-reflective agent for an adhesive, and fixed with a ultraviolet light-curable type adhesive. At that time, the distance between the two polarized components of the forward-direction light was about 16 μm.

In order to minimize the polarization-dependent loss, the light-incident side optical fiber was arranged almost in a middle position between the two polarization optical axes. At that time, the axis of the light-incident optical fiber was positionally deviated from that of the light-incident optical fiber by about 11 μm. This isolator had the smaller number of the parts as compared with that in Example 1. By using the polarization-independent optical isolator thus constructed, a low input loss of 0.5 dB and a high backward-direction loss of 57 dB were obtained without using a lens.

Example 3

In the thus constructed polarization-independent optical isolator of Example 2, a dielectric multi-layer type birefringent material was used for the polarization beam splitters. This multi-layer material was obtained by alternatively laminating amorphous silicon and silicon oxide each having a thickness of 70 μm in a total laminating number of 2000, thereby exhibiting birefringent property. The length of the isolator element in the construction of FIG. 2 was 500 μm. In this construction, a low input loss of 40 dB and a high backward-direction loss of 40 dB were obtained.

(Effects of the Invention)

As is clear from the above explanation, according to the present invention, the compact polarization-independent optical isolator having a high backward-direction loss and a low input loss can be obtained. Further, as compared with the conventional polarization-independent optical isolators, since no lens is used, the number of the parts can be reduced, and the cost can be lessened by eliminating the complicated aligning step.

The scope of the invention should be determined by the appended claims and their legal equivalents, rather than by the examples given.

We claim:

1. A polarization-independent optical isolator comprising:
   a light-emitting side optical fiber having a diameter of a core expanded to give a mode field diameter at an end face of 20 to 50 μm;
   a light-incident side optical fiber having a diameter of a core expanded to give a mode field diameter at an end face of 20 to 50 μm; and an optical isolator element provided between the light-emitting side optical fiber and the light-incident side optical fiber, said optical isolator element comprising:
   a first polarization beam splitter located at a side of the light-emitting side optical fiber;
   a second polarization beam splitter located at a side of the light-incident side optical fiber; and
   a Farady rotator provided between the first polarization beam splitter and the second polarization beam splitter, and at least said first polarization beam splitter being a wedge type polarization beam splitter.

2. The polarization-independent optical isolator set forth in claim 1, wherein in order to correct a deviation in an optical axis between ordinary rays and extra-ordinary rays caused by the first polarization beam splitter, the second polarization beam splitter and the Farady rotator during a forward propagation, an optical axis deviation-correcting element made of a parallel-faced flat plate type polarization beam splitter is provided.

3. The polarization-independent optical isolator set forth in claim 1 or 2, wherein the second polarization beam splitter is a wedge type polarization beam splitter, and the first polarization beam splitter and the second polarization beam splitter are opposed to each other and turned by a half turn around axes of the optical fibers as a center.

4. The polarization-independent optical isolator set forth in claim 1 or 2, wherein the second polarization beam splitter is a wedge type polarization beam splitter, and the first polarization beam splitter and the second polarization beam splitter are arranged at locations axially symmetrical with respect to the Farady rotator.

5. The polarization-independent optical isolator set forth in any one of claims 1 to 2, wherein an incident angle at an end face of each of the light-incident side optical fiber and the light-emitting side optical fiber is not more than 5°.

6. The polarization-independent optical isolator set forth in any one of claims 1 to 2, wherein the first polarization beam splitter and the second polarization beam splitter are each made of a dielectric multi-layer film.

7. The polarization-independent optical isolator set forth in any one of claims 1 to 2, wherein the first polarization beam splitter and the second polarization beam splitter are each made of a birefringent crystal.

8. The polarization-independent optical isolator set forth in any one of claims 1 to 2, wherein the first polarization beam splitter and the second polarization beam splitter are each made of a combination of a dielectric multi-layer film and a birefringent crystal.

9. The polarization-independent optical isolator set forth in claim 3, wherein an incident angle at an end face of each of the light-incident side optical fiber and the light-emitting side optical fiber is not more than 5°.

10. The polarization-independent optical isolator set forth in claim 4, wherein an incident angle at an end face of each of the light-incident side optical fiber and the light-emitting side optical fiber is not more than 5°.

11. The polarization-independent optical isolator set forth in claim 3, wherein the first polarization beam splitter and the second polarization beam splitter are each made of a dielectric multi-layer film.

12. The polarization-independent optical isolator set forth in claim 4, wherein the first polarization beam splitter and the second polarization beam splitter are each made of a dielectric multi-layer film.

13. The polarization-independent optical isolator set forth in claim 5, wherein the first polarization beam splitter and the second polarization beam splitter are each made of a dielectric multi-layer film.

14. The polarization-independent optical isolator set forth in claim 3, wherein the first polarization beam splitter and the second polarization beam splitter are each made of a birefringent crystal.

15. The polarization-independent optical isolator set forth in claim 4, wherein the first polarization beam splitter and the second polarization beam splitter are each made of a birefringent crystal.

16. The polarization-independent optical isolator set forth in claim 5, wherein the first polarization beam splitter and the second polarization beam splitter are each made of a birefringent crystal.

17. The polarization-independent optical isolator set forth in claim 3, wherein the first polarization beam splitter and the second polarization beam splitter are each made of a combination of a dielectric multi-layer film and a birefringement crystal.

18. The polarization-independent optical isolator set forth in claim 4, wherein the first polarization beam splitter and the second polarization beam splitter are each made of a combination of a dielectric multi-layer film and a birefringement crystal.

19. The polarization-independent optical isolator set forth in claim 5, wherein the first polarization beam splitter and the second polarization beam splitter are each made of a combination of a dielectric multi-layer film and a birefringement crystal.

* * * * *